June 12, 1951        F. W. LEE        2,556,199
DYNAMICALLY BALANCED WEIGHT SYSTEM
Filed Dec. 31, 1947        4 Sheets-Sheet 1
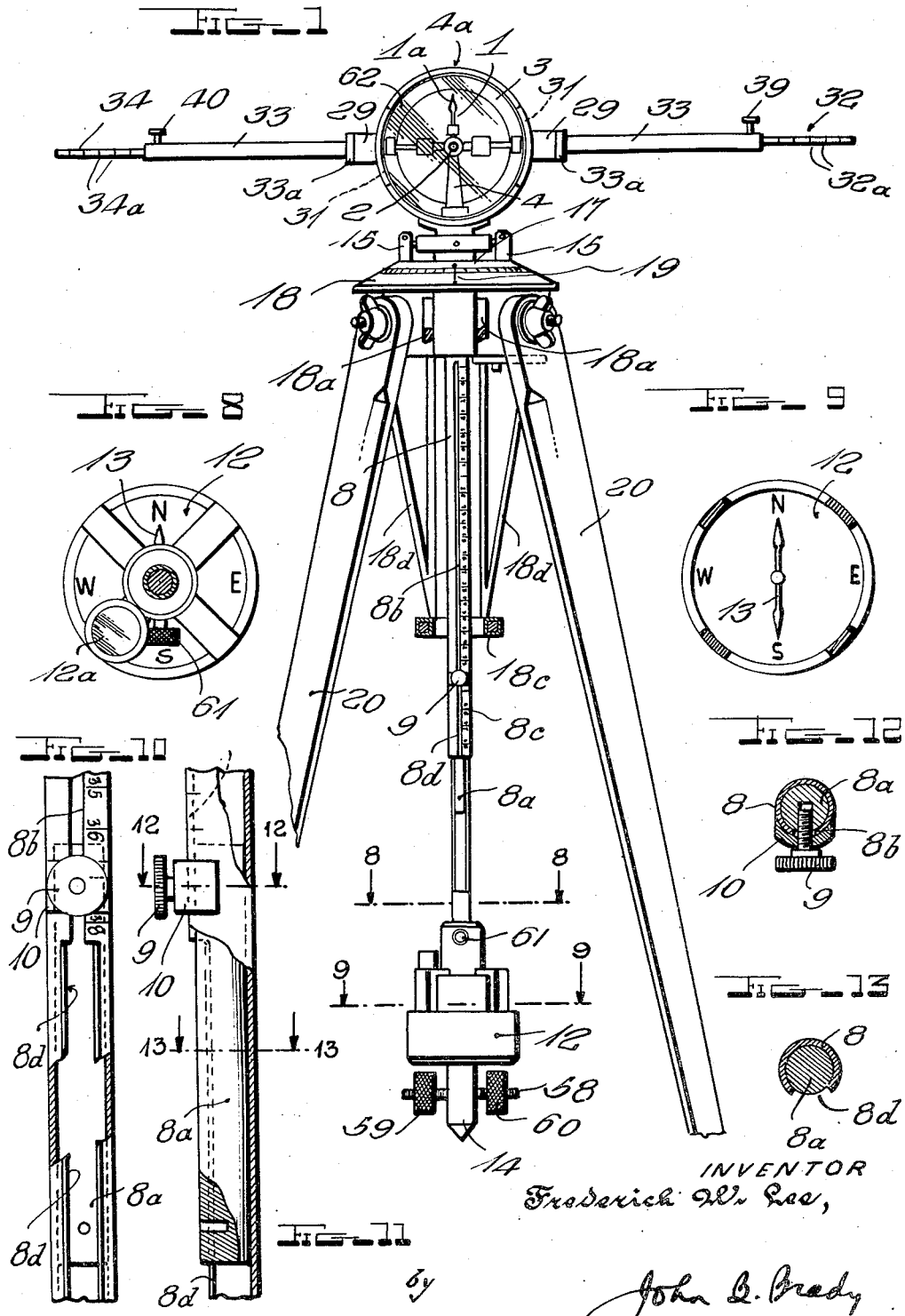
INVENTOR
Frederick W. Lee,
by John B. Brady
ATTORNEY

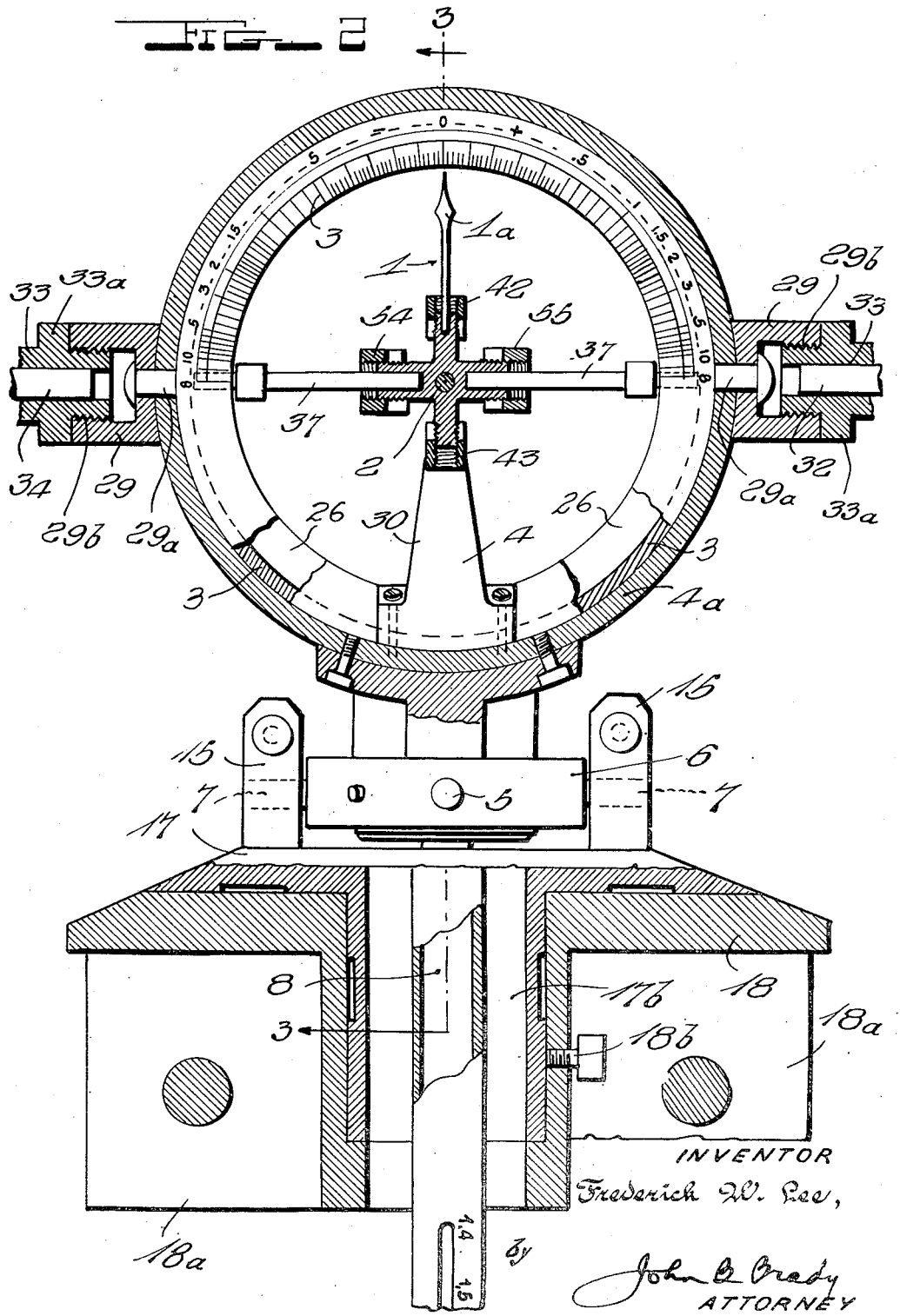

June 12, 1951     F. W. LEE     2,556,199
DYNAMICALLY BALANCED WEIGHT SYSTEM
Filed Dec. 31, 1947     4 Sheets-Sheet 3
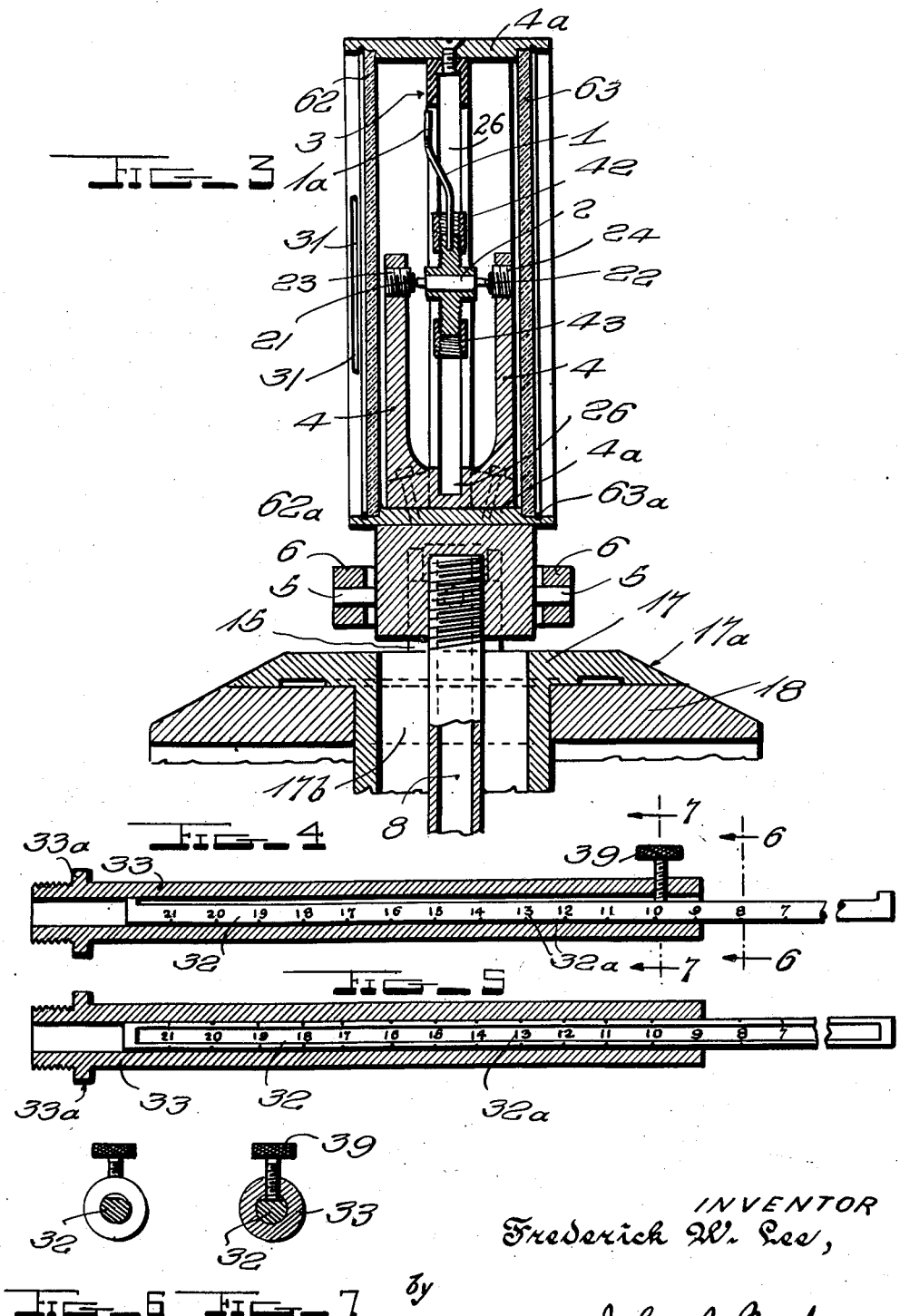
INVENTOR
Frederick W. Lee,
by John B. Brady
ATTORNEY June 12, 1951          F. W. LEE          2,556,199
DYNAMICALLY BALANCED WEIGHT SYSTEM
Filed Dec. 31, 1947          4 Sheets—Sheet 4
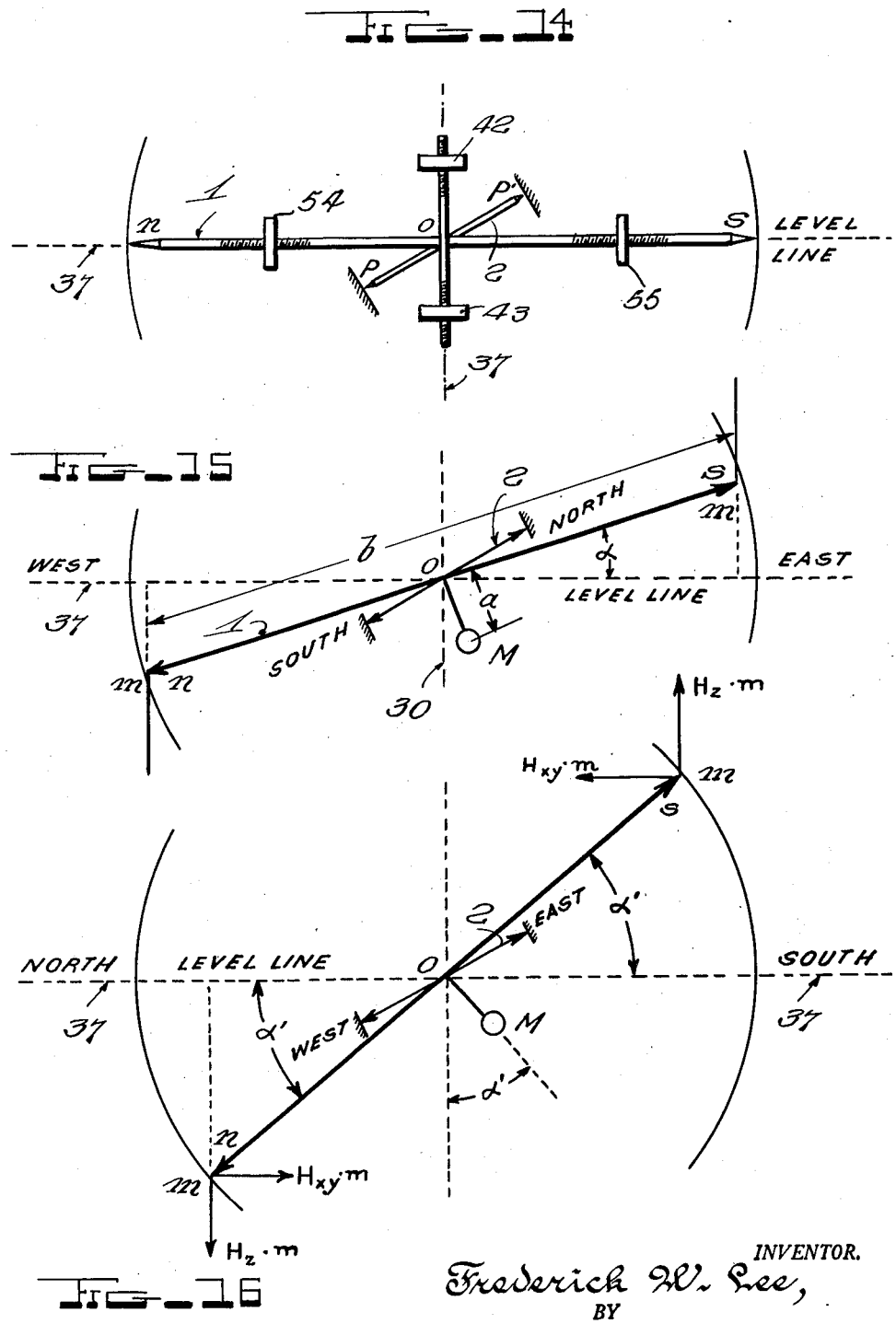
INVENTOR.
Frederick W. Lee,
BY
John Q. Brady
ATTORNEY Patented June 12, 1951

2,556,199

UNITED STATES PATENT OFFICE 2,556,199

DYNAMICALLY BALANCED WEIGHT SYSTEM

Frederick W. Lee, Owings Mills, Md.

Application December 31, 1947, Serial No. 794,881

9 Claims. (Cl. 175—183)

1

My invention relates broadly to instruments for conducting magnetic surveys and more particularly to a sensitive instrument for measuring magnetic fields relating to ore bodies, geological bodies and structures, crystalline basements and other sources of magnetic anomalies.

One of the objects of my invention is to provide a construction of highly sensitive magnetic observing instruments for conducting magnetic surveys.

Another object of my invention is to provide a construction of magnetic measuring instrument, including means for mechanically counterbalancing both vertical and horizontal components of the effects of the magnetic field upon the measuring instrument for accurately determining the magnetic field pattern of ore bodies, geological bodies or structures, crystalline basements, and other sources of magnetic anomalies.

Another object of my invention is to provide a construction of magnetic measuring instrument having an indicating magnetic needle operative over a calibrated scale and associated with composite adjustable magnetic and mechanical means for counterbalancing the indicating magnetic needle and predetermining the zero position thereof.

Other and further objects of my invention reside in a precision construction of magnetic measuring instrument as set forth more fully in the specification hereinafter following by reference to the accompanying drawings, in which:

Figure 1 is a front elevational view of the magnetic measuring instrument of my invention; Fig. 2 is an enlarged front elevational view of the counterbalancing mechanism for the magnetic indicating needle and illustrating certain of the parts in vertical section for more clearly disclosing the coaction of the parts of the measuring instrument; Fig. 3 is a vertical sectional view taken substantially on line 3—3 of Fig. 2; Fig. 4 is a horizontal sectional view taken through one of the magnetic compensating means associated with the measuring instrument of my invention; Fig. 5 is a vertical sectional view of one of the magnetic compensating means of my invention; Fig. 6 is an end view of the magnetic compensating means illustrated in Fig. 4 looking in the direction of arrow A in Fig. 4; Fig. 7 is a vertical sectional view through the magnetic compensating means taken on line 7—7 of Fig. 4; Fig. 8 is a horizontal sectional view showing the pendulum-supported compass and taken approximately on line 8—8 of Fig. 1; Fig. 9 is a horizontal sectional view taken on line 9—9 of Fig. 1 and illustrating

2 the compass which is supported by the depending pendulum; Fig. 10 is a fragmentary side elevation and vertical sectional view of a portion of the pendantly-supported pendulum and illustrating the magnetic compensating means mounted therein; Fig. 11 is a view of the portion of the pendantly mounted pendulum illustrated in Fig. 10 but viewed from a 90 degree position beyond the position illustrated in Fig. 10; Fig. 12 is a horizontal sectional view taken substantially on line 12—12 of Fig. 11; Fig. 13 is a horizontal view taken substantially on line 13—13 of Fig. 11; and Figs. 14–16 are theoretical views explaining the operation of my invention.

The subject matter of this invention concerns an instrument for measuring magnetic fields and in particular those magnetic fields related to ore bodies, geological bodies and structures, crystalline basements and other sources of magnetic anomalies. The instrument is new in that the same measuring arrangement combined in one instrument will measure the following for which a separate instrument is usually employed:

a. The vertical component of the magnetic field.

b. The variation of the vertical component of the magnetic field.

c. The horizontal component of the magnetic field.

d. The variation of the horizontal component of the magnetic field.

e. The declination and the inclination of the magnetic field.

There are a large number of new and novel features embodied in my invention for materially cutting down the costs for making magnetic surveys.

Referring to the drawings in detail, reference character 1 designates the magnetic indicating needle of the measuring instrument of my invention, the needle being journaled upon a horizontal axis 2 for swinging movement with respect to the calibrated scale 3. The needle 1 has an indicating arm 1a connected thereto for registering with the calibrations on scale 3. The needle 1 is supported by, and journaled in a U-shaped frame 4 to which is also attached the scale 3. A gimbal mounting formed by a multiplicity of coacting ring members is provided for supporting the housing 4a with which the U-shaped frame 4 is associated. The gimbal mechanism is represented by cross rod 5 secured to ring 6 which is in turn journaled by means of diametrically extending rod members 7 in upstanding lugs 15 which are attached to the rotatable unit 17 carrying the degree scale 17a at its periphery. The rotatable unit 17 is apertured through its center and is represented at 17b, the aperture being several times larger than the diameter of the stem 8 of the depending pendulum, whereby, the stem 8 of the pendulum can swing freely when the measuring instrument is properly mounted on the tripod support 20. The tripod support 20 serves as a mounting means for the stationary unit 18 which is also calibrated to permit the recording of the azimuthal position of the rotatable unit 17 by the quadrant mark 19 on stationary unit 18. The stationary unit 18 is provided with depending lugs 18a for attachment of the legs of the tripod support 20. Stationary unit 18 also is equipped with a clamping screw 18b for holding the unit 18 in selected position. The stationary unit 18 also provides mounting means for the circular guide ring 18c which is suspended through arms 18d extending from the lugs 18a.

The stem 8 of the pendulum is composed of a non-metallic hollow tube within which the adjustable rod-like magnet 8a is arranged. The magnet 8a may be clamped in any selected position in the pendulum by means of clamping screw 9 acting upon the clamping member 10 on opposite sides of the longitudinally extending slot 8b in the stem 8. The clamping member 10 serves as an indexing member for locating the magnet 8a in a selected position within the pendulum with reference to the calibrations 8c on the stem 8. The rod-like magnet 8a may thus move upwardly or downwardly along the stem 8 for effecting desired magnet counterbalancing of the magnet indicating needle 1 of the instrument. The lower portion of the stem 8 is provided with a wide slot or recess 8d therein, through which the rod-like magnet 8a may be introduced into the stem 8 or removed therefrom for effecting the desired compensation.

The compass 12 having compass needle 13 is mounted at the bottom of the stem 8 together with a counterweight 14. A set screw 61 enables the compass 12 to be adjusted in an angular position with respect to the stem 8. The counterweight 14 has a rod-like member 58 extending diametrically therethrough. The rod-like member 58 is screw-threaded on opposite ends to receive the adjustable weights 59 and 60 which may be rotated on the rod-like member 58 to shift the weights toward or away from the central axis of the stem 8. The compass 12 is also equipped with a level or plumb indicator represented at 12a. The compress is sufficiently removed from the magnetic indicating needle 1 so as not to interfere with each other.

With the parts of the measuring instrument accurately machined and finished to very small tolerances, the axis 2 of the magnetic indicating needle 1 may take a level position when the pendulum, constituted by stem 8, and depending compass 12, and counterweights 14, 59, and 60 comes to rest. It is possible to mark the calibrated scale 3 for its zero position on this level line passing through the center of the supporting axis.

For measuring the vertical component of the magnetic field, the magnet indicating needle 1 is adjusted in an east-west direction by rotating the rotating unit 17 until the compass needle 13 indicates a north-south direction. The azimuth of the compass 12 is so oriented by construction and assembly of the parts that the axis 2 is parallel to the north-south indication on the scale 3. Also by rotating rotatable unit 17 by 90 degrees the direction of the needle 1 will be in the horizontal direction of the magnetic field. There is also provided for properly placing the level line in its correct relation to the scale the balance adjustment composed of the parts 58, 59 and 60. Adjustment of the weights 59 and 60 and adjustment of set screw 61 permits movement of the compass about stem 8 into the azimuth which will permit the line of vertical adjustment to follow into proper relation.

The pivot at the axis 2 is mounted for operation with minimum friction by use of jewel or ball bearings 21 and 22 set into adjustable screw members 23 and 24 threaded into the main U-shaped frame 4. There is a special advantage in using ball bearings 21 and 22 because such bearings can support a relatively heavy magnetic indicating needle 1 with compensating adjustments connected therewith. By making the U-shaped frame 4 of one solid piece, the perfect alignment of the screw holes for the bears 23 and 24 is possible since both can be drilled and tapped at one time and laid off from squared surfaces. There is also provided a trough 26 into which the pole ends of the indicating needle rotate. This trough is made of copper and dampens the swing of the indicating needle. The trough may extend circumferentialy of the calibrated scale 3 and the graduations of the scale 3 may extend over the surface of the trough.

The housing 4a which encloses the U-shaped frame 4 provides diametrically opposite supports 29 for tubular housings which enclose compensating magnets. The diametrically opposite supports 29 are secured through magnetic securing means 29a with the housing 4a in diametrically opposite alignment so that indicating needle 1 may register diametrically therewith. The supports 29 are each internally screw-threaded at 29b and receive the screw-threaded ends of tubular members or housings 33 which abut with end ends of supports 29 through the flanges 33a. The tubular members 33 form supporting means for the rod members 32 and 34 formed from magnetic material. The rod members 32 and 34 are each calibrated as represented at 32a and 34a so that the projection thereof from the tubular members 33 can be selected for a certain scale reading. These adjustable rods 32 and 34 may be selectively clamped in positions by set screws 39 and 40, carried by tubular members 33. The position of the rod members 32 and 34 control the horizontal magnetic component through the magnetic indicating needle 1.

The housing 4a is closed at each side by means of plate glass members 62 and 63 secured in position by means of removable wire-like springs 62a and 63a. A sighting slit 31 is placed in frame support 4a to permit the orientation of azimuths of the needle with reference to base lines astronomically determined. This arrangement, together with the azimuthal scale 3, Fig. 1, permits the measurement of the magnetic declination of the earth's field. It also serves to mark the direction of successive stations of measurement along a traverse line by sighting back and ahead through the slits for a fixed azimuthal direction. There is a very distinct advantage by combining this slit with the self-leveling arrangement which always places this slit 31 automatically in a vertical position.

By starting the graduations with the zero value on the level line, it is possible to make the scale divisions of such a character as will permit the scale reading to be directly proportional to the vertical magnetic intensity of the earth's magnetic field. This scale has a zero value for the level position of the needle 1 and a value of infinity 90° therefrom. The scale is a tangent function. On the other side of scale 3 there is provided a cotangent scale, for determining the horizontal component. Both scales are essential as will be explained hereinafter for measuring the horizontal magnetic components.

The construction of my invention provides for measuring the horizontal magnetic component and its variations by the magnetically balanced system composed of rod members 32, and 34, adjustably mounted in tubular members 33. Tubular members 33 form extensions which can be screwed into supports 29, both having the same mass symmetrically placed about the median line running through the center of suspension 30 and the center of gravity of the movable pendulum, so as not to disturb the level position of the level line 37 with reference to the scale 3. The two identical adjustable rod members 32 and 34 of the same length, each having the same calibrated scale 32a and 34a, slide into tubular members 33 and can be clamped into selected positions by set screws 39 and 40. The magnetic rods 32—34 act as a horizontal in line magnetic counterpoise to the horizontal magnetic field and is useful in this magnetometer for measuring the variation of the horizontal component of the magnetic field. In order to keep the system balanced both rods 32 and 34 are adjusted to the same symmetrical position about line 30. Furthermore, the rods 32 and 34 are so calibrated that they can be inserted into tubular members 33 in reversed direction for magnetically controlling the operation of the instrument.

The operation of this instrument in relation to the automatic level line 37 is described in connection with Figs. 14—15—16. In Fig. 14 we show two counterpoise 42 and 43 for adjusting the sensitivity or center of mass in a vertical direction. Two additional counterpoise, 54 and 55, serve to adjust the center of mass in a horizontal direction of the needle 1 as shown in Fig. 14. For making observation for determining the total absolute value of the magnetic fields both vertical and horizontal components, it is essential that the center of mass be directly below the center of suspension PP' (2) in relation to the level line 37 and the calibration of the functional scale 3. This instrument provides both an automatic level line directly concerned with the measurement function and also a functional scale directly related thereto. When the needle 1 swings in the east-west plane, as shown in Fig. 15, and is therefore not able to move because of the turning effort of the horizontal magnetic component, the instrument measures only the vertical component $H_z$ of magnetic field or variations of the vertical component $a'H_z$. Under this arrangement, when the needle comes to rest in an equilibrium position making an angle $a$ with the level line 37, the magnetic couple and the gravity restoring torque are equal and the following relations apply:

Gravity Torque=Magnetic Torque
$Mg. a \sin a = H_z mb \cos a$

Here M is the mass of the rotating element $a$ is the distance of center of mass from center of axis of rotation, $g$ is the gravity constant, $m$ is the pole strength of the magnet 1, $b$ is the distance between the positive and negative pole of 1 and $a$ is the angle of deflection. The means 42 and 43 are provided for adjusting the center of mass on a line perpendicular to the needle and also passing through axis of rotation of the needle 1. See Figs. 3 and 14.

Under this special condition it follows directly that $$H_z = \frac{Mga}{mb} \cdot \frac{\sin \alpha}{\cos \alpha} = C \tan \alpha \qquad \text{Eq. (1)}$$

Once the needle is properly adjusted by above means C is constant and the function is $\tan \alpha$ which is proportional to $H_z$ and hence the scale 3 of Fig. 2 is the tangent scale measured from the zero level line automatically provided for in this instrument.

For measuring the horizontal component $H_{xy}$ consider the moment relations in Figure 16. Under this condition the plane of the swing of needle is in the north-south magnetic plane by means provided by the compass needle 13. Here both the vertical component $H_z$ as well as the horizontal component $H_{xy}$ are acting at the same time. The following relations hold only for automatic level reference line 37, and means are provided therefore as previously described.

Under this north-south plane of swing of the needle 1 of the magnetic moment of vertical component plus magnetic moment of horizontal component is equal to the restoring gravity moment.

$$H_z.m.b \cos \alpha' + H_{yy}.mb \sin \alpha' = Mga \sin \alpha' \qquad \text{Eq. (2)}$$

$$H_z \cos \alpha' = H_{xy} \sin \alpha' = \frac{Mga}{mb} \sin \alpha' \qquad \text{Eq. (3)}$$

$$H_z + H_{xy} \tan \alpha' = \frac{Mga}{mb} \tan \alpha' \qquad \text{Eq. (4)}$$

$$H_z + H_{xy} \tan \alpha' = C \tan \alpha' \qquad \text{Eq. (5)}$$

It will be noted that the term $C \tan \alpha'$ has the same form as the value for the vertical component, Eq. 1 which here may be called a hypothetical or assumed vertical component called for convenience $H_z'$. This value is read directly from the scale 3 of Fig. 2. Equation (5) now becomes $$H_z + H_{xy} \tan \alpha' = H_z' \text{ and} \qquad \text{Eq. (6)}$$
$$H_{xy} = (H_z' - H_z) \cot \alpha' \qquad \text{Eq. (7)}$$

The cotangent of $\alpha'$ is registered directly on the scale of the reverse side, such as scale 3a in Fig. 2. The total magnetic field $H_T$ is the vector sum of $H_z$ and $H_{xy}$  Eq. (8)

or $$H_T = \sqrt{H_z^2 + H_{xy}^2}$$

and the angle of inclination $$\theta = \tan^{-1} \frac{H_z}{H_{xy}} \qquad \text{Eq. (9)}$$

The angle of inclination is obtained from the azimuthal scale 17 of Fig. 1 as measured through the slits 31 in relation to an astronomically oriented base line, generally the traverse line along which measurements are taken.

The scale constant C can be determined by a Helmholtz coil or a calibrated magnet in the vertical stem of the pendulum rod 8 Fig. 1.

It should be noticed that the value $a$ in Fig. 15 controls the sensitivity or the number of magnetic units generally measured in gammas per scale deflection. The value of $a$ is controlled by the sensitivity adjustment screws 42 and 43. Figs. 2 and 3. When $a$ is small its sensitivity is high, when large its sensitivity is low. The limit of sensitivity is in the bearing support 2.

In addition to the precision balancing of the magnetic indicating needle in the measuring instrument of my invention I call particular attention to the self-leveling feature of the instrument of my invention by which the pendulum coacts with the zero position of the indicating scale so that the scale always reads correctly. I provide a coacting arrangement of magnetic system, one portion of which is associated with the upper portion of the instrument and the other portion of which is located adjacent the plumb bob in the pendulum. My instrument combines both measurement correction and orientation correction in one unit and does not require separate corrections for vertical components and horizontal components.

Automatic leveling is secured, which was not possible in earlier instruments which required leveling by thumb screws.

Magnetic intensities may be read directly on the scales of the instrument by reason of calibrations according to the special scale functions which require no subsequent mathematical interpolations.

While I have found the instrument of my invention highly practical in its construction and operation I realize that modifications and changes may be made and I desire that it be understood that no limitations upon my invention are intended other than may be imposed by the scope of the appended claims.

What I claim as new and desire to secure by Letters Patent of the United States is as follows:

1. A magnetometer comprising a circular frame structure, a circular magnet having a gap therein and housed within said frame structure, a U-shaped member terminating in a pair of substantially parallel faces extending between the ends of said circular magnet at the gap therein, an armature member journalled between said pole faces, said armature member including pairs of diametrically extending projections each having screw-threaded ends, counterbalance weights adjustably screw-threaded on the screw-threaded ends of said armature member, an indicator secured in one of said projections and permanent magnets extending in opposite directions from a pair of projections on said armature member.

2. A magnetometer comprising a circular frame structure, a circular magnet having a gap therein with spaced end portions mounted within said circular frame structure, a U-shaped member mounted in said frame structure between the spaced ends of said circular magnet at the gap therein, an armature journalled in said U-shaped member, said armature comprising sets of arms extending in diametrically opposite directions substantially normal to each other, screw-threads on the ends of each of said arms, adjustable weights engaging said screw-threads, and an indicator secured to one of said arms and permanent magnets secured in others of said arms.

3. A magnetometer comprising a circular frame structure, a circular magnet having a gap therein, a calibrated scale, means supporting said circular magnet and said scale within said frame structure, said circular magnet having its ends terminating in aligned spaced relation at the gap therein, a U-shaped frame mounted between the spaced ends of said magnet, an armature journalled in said U-shaped frame centrally of said circular frame structure, said armature having sets of arms extending in diametrically opposite directions normal to each other, an indicator carried by one of said arms and coacting with said scale and permanent magnets carried by others of said arms and coacting with the circular magnet within said frame structure.

4. A magnetometer comprising a circular frame structure, a circular magnet having a gap therein, a calibrated scale, means supporting said circular magnet and said scale within said frame structure, said circular magnet having its ends terminating in aligned spaced relation at the gap therein, a U-shaped frame mounted between the spaced ends of said magnet, an armature journalled in said U-shaped frame centrally of said circular frame structure, said armature having sets of arms extending in diametrically opposite directions normal to each other, an indicator carried by one of said arms and coacting with said scale, permanent magnets carried by others of said arms and coacting with the circular magnet within said frame structure, the ends of said arms being screw-threaded and adjustable weights engaged with the ends of each of said arms and adjustable toward or away from the journalled axis of said armature for counterbalancing said armature.

5. A magnetometer comprising a circular frame structure, a circular magnet having a gap therein, a calibrated scale, means supporting said circular magnet and said scale within said frame structure, said circular magnet having its ends terminating in aligned spaced relation at the gap therein, a U-shaped frame mounted between the spaced ends of said magnet, an armature journalled in said U-shaped frame centrally of said circular frame structure, said armature having sets of arms extending in diametrically opposite directions normal to each other, an indicator carried by one of said arms and coacting with said scale, permanent magnets carried by others of said arms and coacting with the circular magnet within said frame structure, sleeve members extending from said frame structure in diametrically opposite directions and magnetic members insertable into and removable from said sleeve members.

6. In a magnetometer, a frame structure, an armature journalled with respect to said frame structure, said armature being formed from magnetic material having sets of arms extending in diametrically opposite directions substantially normal to each other, one set of said arms having sockets formed therein, said last mentioned arms being screw-threaded at their extremities, screw-threaded sleeve members engageable with the screw-threaded ends of said last mentioned arms and permanent rod-like magnetic members insertable into the sockets carried in said arms, the sleeve members on said last mentioned arms being adjustable with respect to said arms for distributing the mass of said armature with respect to the center of movement thereof.

7. In a magnetometer, a frame structure, an armature journalled with respect to said frame structure, said armature being formed from magnetic material having sets of arms extending in diametrically opposite directions substantially normal to each other, one set of said arms having sockets formed therein, said last mentioned arms being screw-threaded at their extremities, screw-threaded sleeve members engageable with the screw-threaded ends of said last mentioned arms, permanent rod-like magnetic members insertable into the sockets carried in said arms, the sleeve members on said last mentioned arms being adjustable with respect to said arms for distributing the mass of said armature with respect to the center of movement thereof, an indicator carried by another of said arms and an adjustable sleeve associated with said last mentioned arm and movable concentrically with respect to said indicator toward or away from the center of movement of said armature.

8. In a magnetometer, a journalling means, an armature mounted in said journalling means, radially extending magnetic projections on said armature, screw-threads on the end of each of said projections, sleeve-like members internally screw-threaded to engage the screw-threads on the ends of said projections, one pair of said projections having sockets therein, permanent magnetic rods mounted in said sockets, another of said projections having a socket therein and an indicator mounted in the socket in said last mentioned projection.

9. In a magnetometer, a circular frame structure enclosing an annular calibrated scale therein, a curved magnetic member located within said frame structure and terminating in spaced ends, a supporting member extending into said frame structure between the spaced ends of said curved magnetic member, an armature journalled in said supporting member, said armature being formed substantially in the shape of a cross with magnetic projections extending in diametrical opposite directions, one pair of diametrically opposite projections having sockets in the ends thereof, magnetic rods supported in said sockets and the ends thereof movable in a path immediately adjacent said curved magnetic member and another of said projections having a socket therein for receiving an indicator movable with respect to said scale, the ends of said projections being externally screw-threaded and adjustable sleeves each internally screw-threaded and engageable over the external screw-threads on said projections for counter-balancing the operation of said armature.

FREDERICK W. LEE.

REFERENCES CITED

The following references are of record in the file of this patent:

UNITED STATES PATENTS

| Number | Name | Date |
|---|---|---|
| 1,702,868 | Hotchkiss et al. | Feb. 19, 1929 |
| 1,909,619 | Herrick | May 16, 1933 |
| 2,123,045 | Hoare | July 5, 1938 |
| 2,151,627 | Vacquier | Mar. 21, 1939 |
| 2,357,319 | Esval et al. | Sept. 5, 1944 |
| 2,397,137 | Glennon et al. | Mar. 26, 1946 |
| 2,420,580 | Antes | May 13, 1947 |
| 2,487,047 | Farnham | Nov. 8, 1949 |